United States Patent [19]

Yi

[11] Patent Number: 5,046,465
[45] Date of Patent: Sep. 10, 1991

[54] ROTARY INTERNAL COMBUSTION ENGINE

[76] Inventor: Chong S. Yi, 4D-15 79st #40, Elmhurst, N.Y. 11373

[21] Appl. No.: 394,535

[22] Filed: Aug. 16, 1989

[51] Int. Cl.⁵ ............................................. F02B 53/00
[52] U.S. Cl. ................................... 123/248; 418/104; 418/222
[58] Field of Search ................ 123/237, 248; 418/104, 418/141, 222

[56] References Cited

U.S. PATENT DOCUMENTS

| | | | |
|---|---|---|---|
| 1,247,973 | 11/1917 | Langteig | 123/248 X |
| 1,270,245 | 6/1918 | Beard | 123/237 |
| 1,333,399 | 3/1920 | Erickson | 123/248 X |
| 1,970,003 | 8/1934 | Fenati | 123/248 X |
| 2,004,563 | 6/1935 | Bogoslowsky | 418/141 |
| 2,760,466 | 8/1956 | Black | 418/222 X |
| 3,824,044 | 7/1974 | Hinckley | 418/141 X |

FOREIGN PATENT DOCUMENTS

| | | | |
|---|---|---|---|
| 437640 | 2/1912 | France | 123/248 |
| 522111 | 3/1921 | France | 123/248 |

Primary Examiner—Michael Koczo
Attorney, Agent, or Firm—Birch, Stewart, Kolasch & Birch

[57] ABSTRACT

A rotary internal combustion engine which comprises a housing containing an axle, a pair of toroidal casings both containing a rotor with a piston disposed within the respective casings, an on/off valve for forming an ignition and explosion zone together with the piston disposed in the casings, and a gas outlet in the vicinity of the on/off valve disposed in the casings, whereby the rotation of the rotor within the internal combustion engine is achieved by transferring a compressed air-fuel mixture into the ignition and explosion zone, igniting the mixture and simultaneously, exploding, and exhausting the combusted gas through the gas outlet, thereby causing the rotation of the rotors together with the axle.

8 Claims, 4 Drawing Sheets

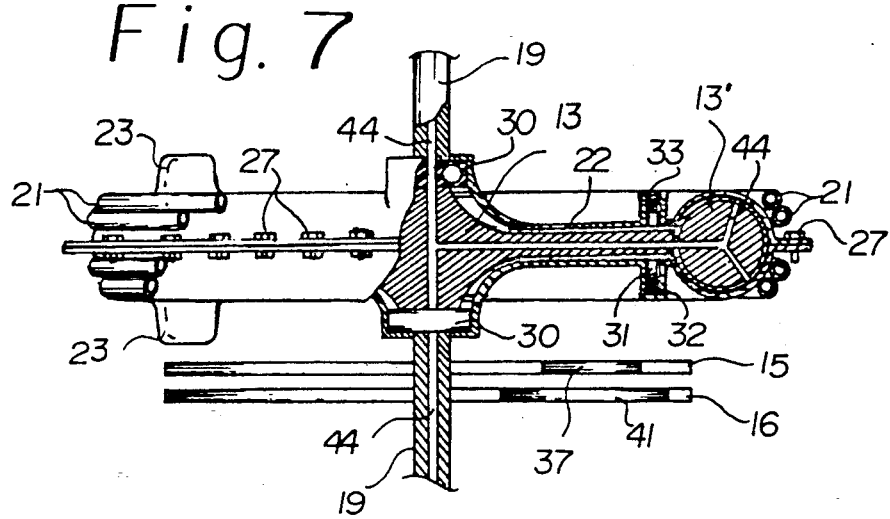
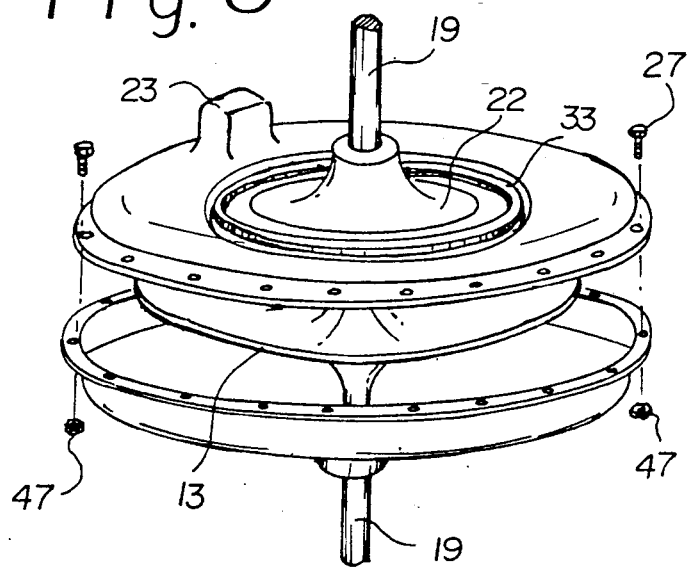
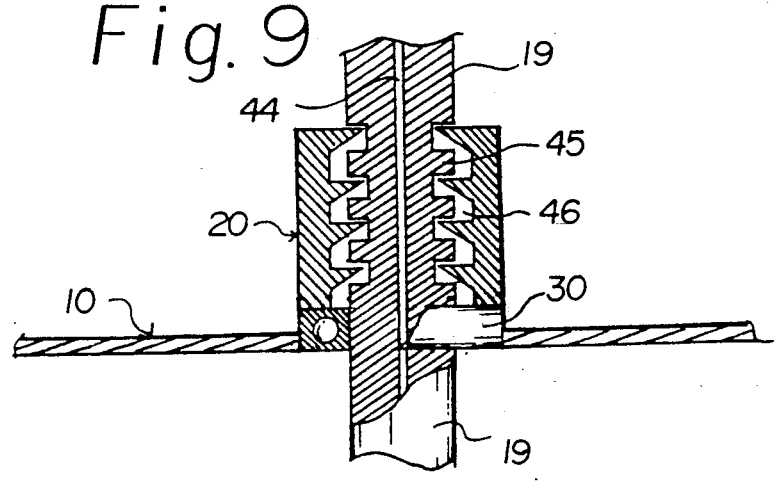

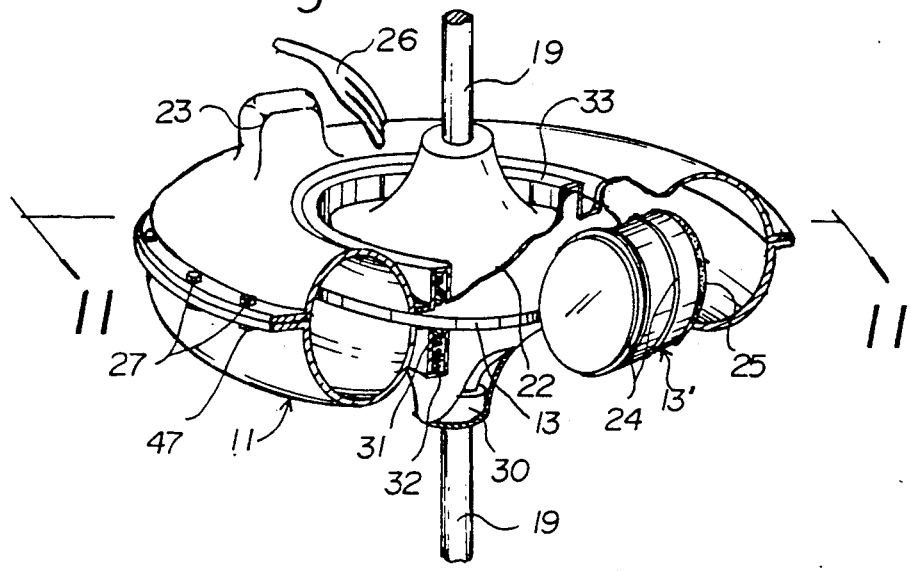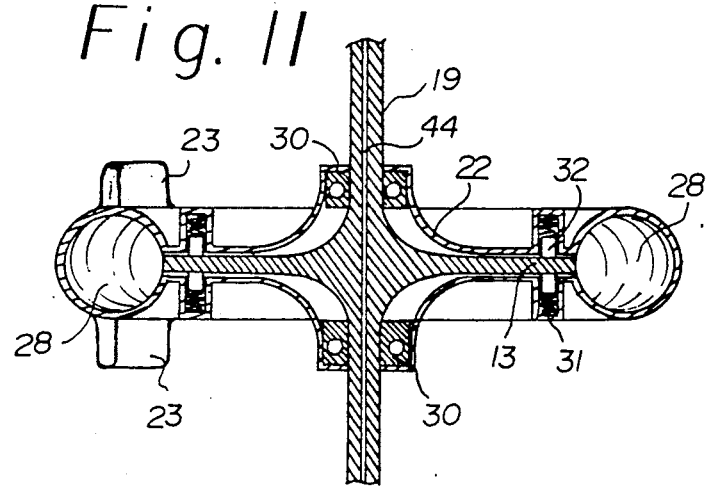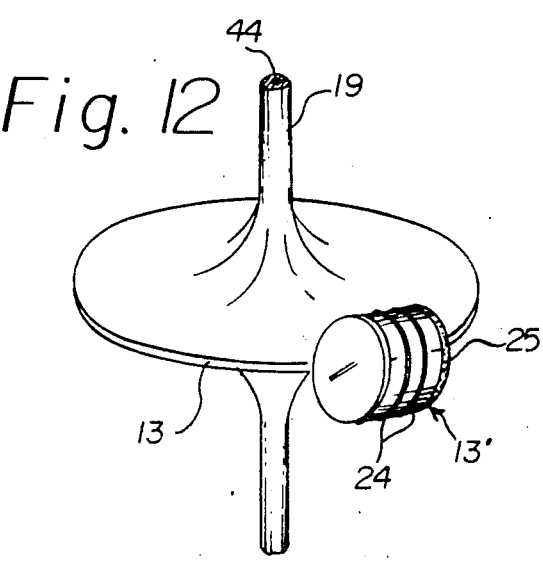

ROTARY INTERNAL COMBUSTION ENGINE

FIELD OF THE INVENTION

1. Field of the Invention

The present invention relates to a rotary internal combustion engine and more particularly, to a rotary engine apparatus which includes an upper toroidal casing and a lower toroidal casing having a rotor with a piston, and an ignition and explosion zone disposed between the piston and a valve in the toroidal casings, respectively, whereby rotation of the rotor of the rotary engine is achieved by transferring a compressed air-fuel mixture into the ignition and explosion zone, igniting and exploding the mixture, and exhausting the gases of combustion.

2. Description of the Prior Art

Various types of internal combustion engines are well known in the art. For example, in the combustion cycle of the conventional piston engine, the piston must always come to a complete stop and reverse direction and the piston requires a connecting rod and crankshaft to convert its up and down motion into a torque. On the other hand, the rotary engine directly generates torque although in some designs of the rotary engine a "top dead center" type of problem still exists. In the rotary engine, the engine is provided which has fewer moving parts, has less weight and occupies less space, for a comparable horsepower.

Furthermore, the piston of the internal combustion engine is inefficient in its use of the power available in the exploded air-fuel mixture. If a piston engine has a 3-inch stroke, then the crank distance, i.e. the distance from the center of the drive shaft to the center of the crank bearing where the driving pressure is applied, is 1.5 inches. In the piston engine, the pressure from the explosion is applied with full efficiency only when the connecting rod is at right angles to the crank, i.e., when there is maximum leverage on the crank. Thus, as the crank turns from the top-dead-center position of the piston, where the pressure from the explosion in relation to the torque is zero, the leverage efficiency increases progressively until the right-angle position is achieved, and then drops off until the crankshaft reaches the bottom-dead-center position of the piston, where the leverage efficiency again is zero. Hence, the only significant productive leverage on the crank shaft from the pressure applied is derived between the 2 and 4 o'clock positions of the revolution of the crank shaft. Thus, only at this time is there efficient conversion into power output of the pressure of the explosion of the air-fuel mixture in the piston engine.

Rotary automobile engines have advantages over piston engines in that by the utilization of a rotor, which rotates within a stationary enclosure, the piston of the conventional internal combustion engine is eliminated.

A number of suggestions have been made to employ a rotor mounted for rotation within a stationary casing and including a plurality of retractable vanes mounted substantially radially in the rotor.

A typical example of such a rotary engine is disclosed in U.S. Pat. No. 1,279,195, in which a substantially circular rotor is mounted in an elliptical chamber. U.S. Pat. No. 917,165 also discloses a circular rotor which is mounted in an elliptical casing and provided with vanes which engage the inner walls of the casing. In these prior art engines, the pressure of the compressed gases before ignition tends to prevent the vanes from extending to engage the chamber wall.

Also, the "Wankel" engine includes a three-cornered cam motor mounted in a geared manner to a power take-off shaft. The chamber is of a generally oval cross-sectional shape and each of the three corners of the cam engage the inner wall of the chamber during rotation. In order to achieve this, the cam has a central circular opening having gear teeth on the inner face and these teeth mesh with a small pinion gear mounted on the power take-off shaft. The cam therefore rotates eccentrically about the power take-off shaft.

U.S. Pat. 3,780,708 discloses a rotary combustion engine which includes a rotor concentric with and rotatable about a stator having a plurality of baffles with the rotor and stator cooperatively defining a plurality of working chambers that are spaced about and rotate with the rotor.

U.S. Pat. 3,791,353 discloses a rotary engine which includes a plurality of elongated vanes, abutments, recesses, and chambers therein. All of the engines of the above patents are complicate in construction, difficult in use, and expensive to manufacture. Furthermore, such engines have proven to be unpractical for various purposes.

SUMMARY OF THE INVENTION

Accordingly, it is an object of the present invention to provide an improved rotary internal combustion engine.

Another object of the present invention is to provide a rotary combustion engine which includes a housing containing an axle, an upper toroidal casing and a lower cylindrical casing having a rotor with a piston which are both disposed in parallel within the housing, and an ignition and explosion zone disposed between the piston and a valve in the toroidal casings, respectively, whereby the rotation of the engine is achieved by transferring the compressed air-fuel mixture into the ignition and explosion zone, igniting and exploding the mixture, and exhausting gases of combustion thereby causing the rotation of the rotor with the axis.

A further object of the present invention is to provide a rotary engine which is economical to manufacture and durable in use, and does not suffer from the drawbacks of the prior art, vane-type rotary engines.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly, the present invention relates to a rotary internal combustion engine which comprises a housing containing an axle, a pair of toroidal casings both disposed in parallel within the housing, the toroidal casings containing a rotor with a piston disposed within the casings, respectively, an on/off valve for forming an ignition and explosion zone with the piston disposed in the casings, respectively, and a gas outlet in the vicinity of the on/off valve disposed in the casings, respectively, whereby the rotary internal combustion engine is achieved by transferring a compressed air-fuel mixture into the ignition and explosion zone, igniting and simultaneously exploding the mixture, and exhausting gases of combustion through the gas outlet, thereby causing rotation of the rotors with the axis.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a front elevational view of the cylindrical casing of the apparatus according to the present invention containing cut-away portions in order to illustrate basic components, particular oil supply conduits, disposed in the cylindrical casing;

FIG. 8 is a perspective view of the toroidal casing of the apparatus according to the present invention;

FIG. 9 is a sectional view of FIG. 1, taken along line 9—9.

FIG. 10 is a perspective view of the toroidal casing of the apparatus according to the present invention containing cut-away portions in order to illustrate a rotor having a piston which is slidably rotated along the toroidal casing;

FIG. 11 is a cross-sectional view of FIG. 10, taken along line 11—11; and

FIG. 12 is a perspective view of the rotor having the piston of the apparatus according to the present invention.

DESCRIPTION OF THE PREFERRED EMBODIMENTS

Figure 1:
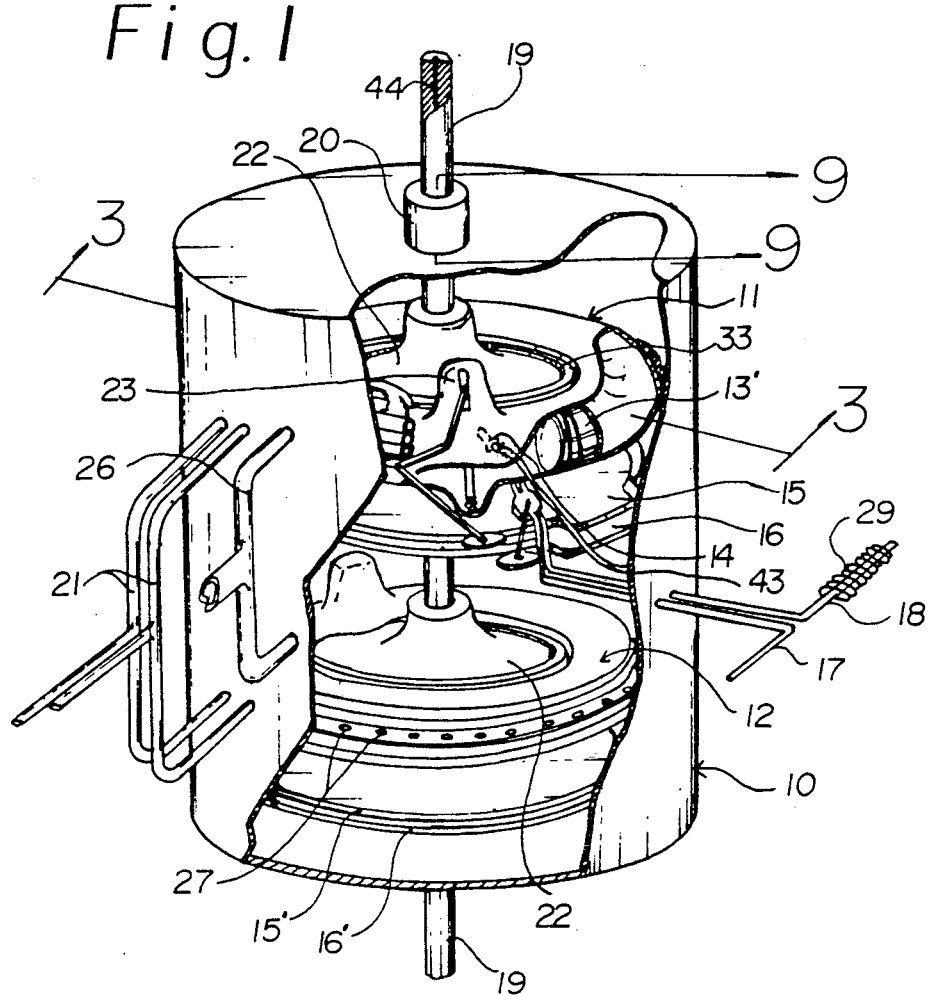
FIG. 1 is a perspective view of a rotary internal combustion engine according to the present invention containing cut-away portions in order to illustrate the construction of the apparatus according to the present invention.
Figure 2:
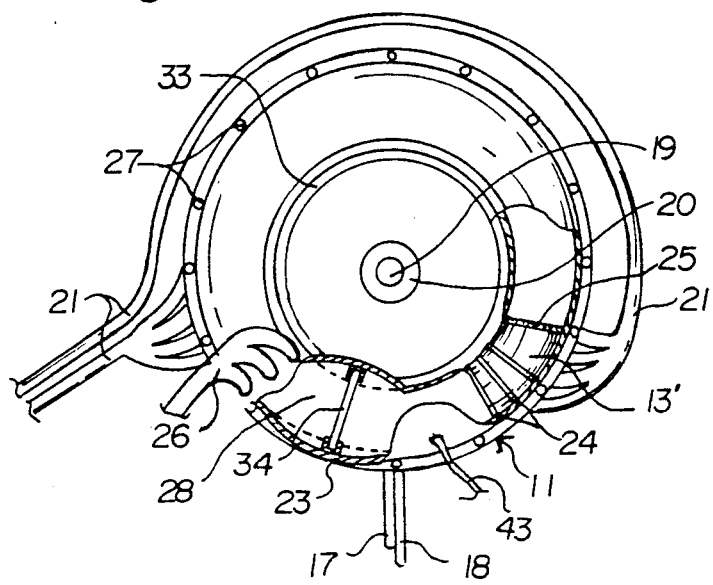
FIG. 2 is a top plan view of a toroidal casing of the apparatus according to the present invention containing cut-away portions in order to illustrate the basic components disposed in the toroidal casing.
Figure 3:
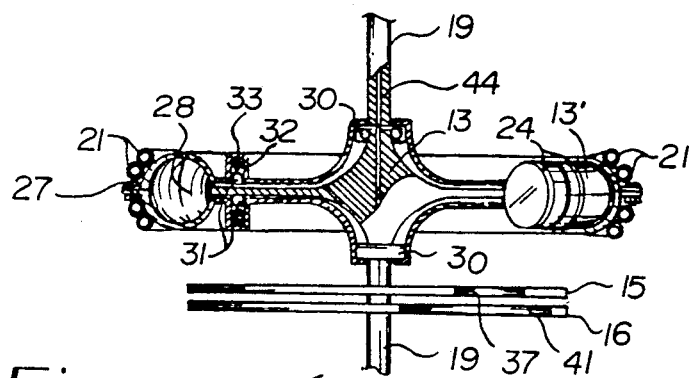
FIG. 3 is a cross-sectional view of FIG. I, taken along line 3—3.
Figure 4:
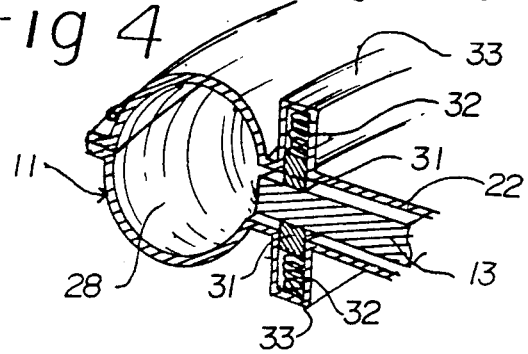
FIG. 4 is an enlarged, cross-sectional view of the left side portion of FIG. 3.

Referring now in detail to the drawings for the purpose of illustrating the preferred embodiments of the present invention, a rotary internal combustion engine as shown in FIGS. 1, 2, and 3 a housing 10, an axle 19 mounted to rotate in the center of the housing 10 comprises an upper toroidal casing 11 and a lower torodial casing 12 both disposed in parallel to each other within the housing 10, an upper valve plate 15 and an upper gas plate 16 operatively associated with the upper toroidal casing 11, and a lower valve plate 15' and a lower gas plate 16' operatively associated with the lower toroidal casing 12 and fixedly mounted to the axis 19. The upper and lower toroidal casings 11 and 12 define a space which rotatably contain a rotor 13 provided with a piston 13'. Each of the casings is also provided with a respective chamber 28. The rotor 13 is fixedly mounted on the axle 19 and is journalled for rotation on the axle 19 generally in the counterclockwise direction and the piston 13' is projected to extend into the chamber 28.

Also the upper and lower toroidal casings 11 and 12 include upper and lower explosion zones 23 which define the chamber 28 and having a convex configuration. The upper explosion zone 23 is always located at the opposite side from the lower explosion zone 23 so that the upper and lower explosion zones 23, having an explosion function with respect to the compressed air-fuel mixture disposed therein make the axle 19 rotate substantially in the counterclockwise direction, respectively. The upper and lower toroidal casings 11 and 12 are provided with a plurality of refrigerating pipes 21 for cooling the respective end chambers 28 by circulating a coolant therethrough (FIGS. 2, 3, and 7).

Figure 5:
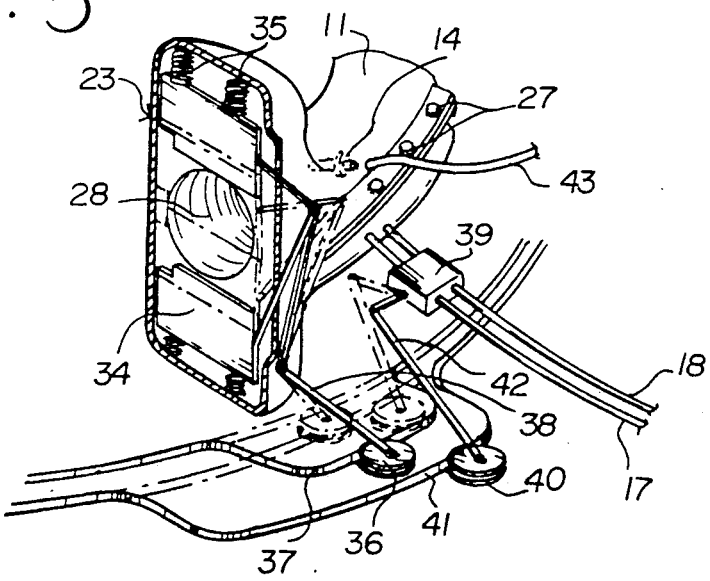
FIG. 5 is a perspective view of valve member of the apparatus according to the present invention containing cut-away portions in order to illustrate the construction of the valve member.

As shown in FIGS. 1, 2, and 5, the explosion zone 23 which extends from the top to the bottom of the chamber 28 includes a pair of valve doors 34 biased by a pair of valve springs 35 for forming an ignition and explosion zone with the piston 13' only when the pair of valve doors 34, are closed. A gas intake pipe 17 for supplying of compressed fuel, an air intake 18 for supplying air, and a glow or heater plug 14 connected to an electrical source (not shown) through an electric wire 43 are operatively connected to the explosion zone. The air and compressed fuel are mixed in the ignition and explosion zone 23 to become a compressed air-fuel mixture. Combusted gas outlet pipes 26 are disposed in the vicinity of the explosion zone 23 for exhausting the gases of combustion after the air-fuel mixture is exploded by ignition with the glow plugs 14, respectively. The air intake 18 is wound by a heating coil 29 for initially heating the air.

The upper and lower valve plates 15 and 15' have peripheral surfaces which are provided with respective extended edge plates 37. The upper and lower gas plates 16 and 16' have peripheral surfaces which are also provided with extended edge plate 41 which extend beyond edge plates 37. In the upper and lower toroidal casings 11 and 12, a first connecting bent rod 38 is pivotally attached at one end to rod members extending from the pair of valve doors 34 and at the other end to a first roller 36 for travelling along the peripheral surface of the valve plate 15 and the extended edge plate 37. That is, when the first roller 36 travels along the extended edge plate 37, the valve doors 34 are opened whereas when the first roller 36 travels along the circumferential edge of the valve plate 15, the valve doors 34 are closed by the pivotal action of the first connecting bent rod 38 and the rod members. Also, a second connecting bent rod 42 is attached at one end to an on/off switch 39 associated with the air and gas intake pipes 17 and 18 and at the other end to a second roller 40 which travels along the peripheral surface of the gas plate 16 and its extended edge plate 41. Therefore, when the first rollers 36 rotate along the extended ends 37 of the upper and lower valve plates 15 and 15', the pair of valve doors 34 are open for passing the pistons 13' along the chambers 28, respectively. At that time, the second rollers 40 rotate along the edge plate 41, which defines the "off" position of the on/off switch 39 for stopping the supply of compressed gas through the gas intake pipe 17 and air through the air intake pipe 18. On the other hand, when the pair of valve doors 34 are closed, the ignition and explosion zone is formed between the closed valve doors 34 and the piston 13'. At that time, the on/off switch 39 is in an open position and the air-fuel mixture is supplied to the ignition and explosion zone 23.

Figure 6:
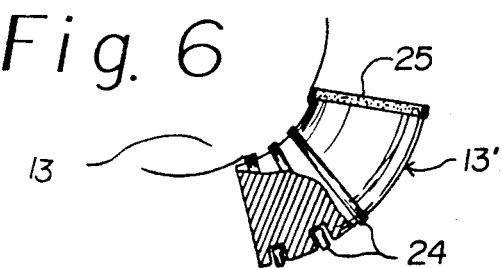
FIG. 6 is a top plan view of a piston of the apparatus according to the present invention.

As shown in FIGS. 6, 10, and 12, the pistons 13' contain a plurality of sealing rings 24 and an asbestos sealing ring 25 for preventing the flow of the air-fuel mixture between the pistons 13' and the end chambers, respectively.

The upper and lower toroidal casings 11 and 12 are assembled by bolts 27 and nuts 47 (FIG. 8). Also the circumferential end portions disposed at the inside area of the upper and lower toroidal casings 11 and 12 have a raised configuration 33 for easily receiving springs 32. The upper and lower toroidal casings 11 and 12 have a lower cover 22 which extends from the raised configuration 33 of the outer surface of the chambers 28, respectively.

As shown in FIG. 9, the axle 19 is rotatably mounted to the housing 10 through top and a bottom connecting members 20 with bearings 30. The connecting members 20 contain a plurality of grooves 46 for mating with a plurality of teeth 45 disposed on the outer surface of the axle 19 for preventing compressed air from leaking from the housing 10. That is, when the first roller 36 travels along the extended edge plate 37, the value doors 34 are opened whereas when the first roller 36 travels along the circumferential edge of the valve plate 15, the value doors 34 are closed by the pivotal action of the first connecting bent rod 38 and the rod members.

As shown in FIGS. 7, 10, and 11, the rotors 13 having the pistons 13' disposed within the upper and lower toroidal casings 11 and 12 include a plurality of oil conduits 44 disposed in the center thereof, respectively for supplying lubricating oil between the end chambers 28 and the pistons 13' so as to lubricate the pistons 13' and prevent the pressurized air from leaking from the end chambers 28. Also, the rotors 13 are both provided with anti-leakage rings 31 disposed on the outer surface of the top and the bottom of a circumferential portions thereof, respectively, for preventing the compressed air from leaking from the chambers 28 after explosion of the compressed air-fuel mixture. The anti-leakage rings 32 are provided with the plurality of springs 32 mounted in the circular vanes 33 for biasing the anti-leakage rings 32 against the rotors 13.

According to the present invention, the apparatus operates as follows:

As shown in FIG. 2, for example, the ignition and explosion zone is formed in the upper toroidal casing 11 between the closed valve doors 34 and the piston 13' disposed near the closed doors 34. With the on/off switch 39 in the "on" position, a compressed air-fuel mixture is transferred from the gas intake pipe 17 and the air intake pipe 18 and the mixture is exploded by the spark plug 14. Thus, the piston 13' rotates strongly along the end chamber 28 and in turn rotates the rotor 13 in the counterclockwise direction as indicated by the arrow shown in FIG. 1. At that time, since the explosion zone 23 of the upper toroidal casing 11 is always positioned opposite to that of the lower toroidal casing 12, the rotors 13 of the upper and lower toroidal casings 11 and 12 simultaneously rotate the axle 19 in the counterclockwise direction. Since the air-fuel mixture is continuously supplied to the ignition and explosion zone where it is ignited by the spark plug, the mixture is continuously exploded so that the axle 19 rotates very fast in the counterclockwise direction. The gases of combustion are exhausted through the gas outlet 26. Thus the upper and lower toroidal casings 11 and 12 rotate in the counterclockwise together in the opposite side from each other. The operation of the upper and lower toroidal casings 11 and 12 is repeated continuously so that the axle 19 rotates continuously. However, the speed of rotation of the axle 19 depends on the amount of air-fuel mixture supplied by the gas intake and air intake pipes 17 and 18.

The ignition and explosion chamber occupies about two thirds of the circular chamber. Therefore, the length of the explosion stroke according to the present invention is longer than that of conventional devices, whereby the engine of the present invention provides many advantages compared with the prior art devices, as follows:

(a) The structure of the engine according to the present invention is simple so that the weight of the internal combustion engine is light;

(b) the torque of the engine is increased and the vibration of the engine is reduced so that engine noise is substantially reduced;

(c) since the range of RPM is 1-500, the transmission of the engine has little gear group;

(d) any type of fuel can be used in the ignition chamber, such as gasoline, alcohol, propane gas, or the like; and (e) the heat efficiency can be increased.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A rotary internal combustion engine comprising:
a housing;
an axle mounted to rotate in the center of said housing,
a first toroidal casing having a first circular chamber disposed within said housing, said first toroidal casing containing a first rotor rotatably disposed therein, said first rotor being fixedly mounted to said axle,
a first piston connected to said first rotor and slidably engaged within said first circular chamber for slidably moving along said first circular chamber,
a second toroidal casing having a second circular chamber disposed in parallel with said first toroidal casing within said housing, said second toroidal casing containing a second rotor rotatably disposed therein, said second rotor being fixedly mounted to said axle, said first and second rotors including a plurality of oil conduits and a pair of anti-leakage rings which extend from the circumferential portions of the top and bottom surfaces thereof, respectively, for preventing the compressed air from leaking from the chamber, said anti-leakage rings being provided with an anti-leakage spring, respectively, for easily receiving the piston in the toroidal casing,
a second piston connected to said second rotor and slidably engaged within said second circular chamber for slidably moving along said second circular chamber, said first and second pistons including a pair of rings disposed at the periphery thereof, respectively, and a plurality of oil conduits extending from said oil conduits of the rotors for supplying lubricating oil between walls of the chambers and the pistons so as to lubricate the pistons and prevent the pressured air from leaking from the chambers.

a first valve member and a second valve member disposed within said first and second toroidal casings, respectively, said first and second valve members including first and second valve doors which are adapted to open or close so as to permit or prevent the piston from passing, respectively, said first and the second valve members containing a pair of valve doors connected to first and second valve rollers through a connecting rod member for opening and closing the valve doors depending on the rotary position of first and second valve rollers, a first valve plate fixedly mounted to said axle and disposed in parallel with said first toroidal casing within the housing, said first valve plate having a peripheral edge portion and an extended edge portion for operatively guiding the rotation of the first valve roller therealong, said first valve roller being connected to said first valve doors, a first gas plate fixedly mounted to said axle and disposed in parallel with said first valve plate within the housing, said first gas plate having a peripheral edge portion and an extended edge portion for operatively guiding the rotation of a first gas roller therealong;

a second valve plate fixedly mounted to said axle and disposed in parallel with said second toroidal casing within the housing, said second valve plate having a peripheral edge portion and an extended edge portion for operatively guiding the rotation of the second valve roller therealong, said second valve roller being connected to said second valve doors, said second gas plate fixedly mounted to said axle and disposed in parallel with said second valve plate within the housing, said second gas plate having a peripheral edge portion and an extended edge portion for operatively guiding the rotation of a second gas roller therealong, refrigeration means are connected to said first and second toroidal casings through a wall of said housing for cooling the first and second chambers, connecting means are connected to said first and said second toroidal casings through a wall of said housing for exhausting combustion gases from the first and second circular chambers, first and second air and gas intakes are connected to said first and said second circular chambers, respectively, for supplying a compressed air-fuel mixture to the first and second circular end chambers, and spark forming means associated with an ignition and explosion zone formed between said first and second pistons and said first and second valve members respectively, in said first and said second circular chambers, whereby the rotation of the rotor within the internal combustion engine is achieved by transferring the compressed air-fuel mixture to the ignition and explosion zone, igniting and simultaneously exploding the mixture, and exhausting the gases of combustion whereby rotation of the rotors together with the axle is achieved.

2. The rotary internal combustion engine of claim 1, wherein the housing is provided with contacting members thereof at mutual contacting portions of the housing and the axle, each of said contacting members including a plurality of grooves which mate with a plurality of teeth disposed on the outer surface of the axle so as to prevent the pressured air from leaking therefrom.

3. The rotary internal combustion engine of claim 1, wherein the valve doors open when the first and second rollers rotate along the extended ends of the first and second valve plates.

4. The rotary internal combustion engine of claim 1, wherein first and second on/off switches are connected to said first and second gas rollers through first and second connecting rods for performing in the "on" or "off" position thereof depending on the rotating position of the first and second gas rollers, whereby the air and compressed fuel is supplied to the ignition and explosion zone.

5. The rotary internal combustion engine of claim 4, wherein the on/off switch is in the "off" position when the first and second gas rollers rotate along the peripheral extended end portion of the first and second gas plates for stopping the supply of the air and compressed fuel to the ignition and explosion zone.

6. The rotary internal combustion engine of claim 1, wherein the means for refrigeration is a plurality of pipes which are provided with a circulating coolant for cooling the circular chambers.

7. The rotary internal combustion engine of claim 1, wherein the connecting rod member includes a pair of rod members extending from said pair of valve doors and a connecting bent rod pivotally attached to said rod members.

8. The rotary internal combustion engine of claim 1, wherein the spark forming means is a glow or heater plug.

* * * * *